(12) United States Patent
Nagi et al.

(10) Patent No.: US 12,246,627 B2
(45) Date of Patent: Mar. 11, 2025

(54) DISPLACEABLE PANEL FOR SEATING ASSEMBLY

(71) Applicant: Ford Global Technologies, LLC, Dearborn, MI (US)

(72) Inventors: Ranjit Nagi, Northville, MI (US);
Nathan Pabalate, Windsor (CA);
Nicholas Gilbert, Livonia, MI (US);
Patrick Davis, Royal Oak, MI (US);
Megan Romelfanger, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/482,352

(22) Filed: Oct. 6, 2023

(65) Prior Publication Data
US 2024/0034202 A1 Feb. 1, 2024

Related U.S. Application Data

(62) Division of application No. 17/446,722, filed on Sep. 2, 2021, now Pat. No. 11,820,259.

(51) Int. Cl.
*B60N 2/22* (2006.01)
*B60N 2/02* (2006.01)
*B60N 2/36* (2006.01)
*B60N 2/68* (2006.01)

(52) U.S. Cl.
CPC ........... *B60N 2/2209* (2013.01); *B60N 2/028* (2013.01); *B60N 2/2222* (2013.01); *B60N 2/36* (2013.01); *B60N 2/686* (2013.01)

(58) Field of Classification Search
CPC ........ B60N 2/028; B60N 2/2222; B60N 2/36; B60N 2/66; B60N 2/686; B60N 2/2209
See application file for complete search history.

(56) References Cited

U.S. PATENT DOCUMENTS

| | | | | |
|---|---|---|---|---|
| 4,550,949 A * | 11/1985 | Sakamoto | ............... | B60N 2/66 |
| | | | | 297/284.1 |
| 7,401,852 B2 | 7/2008 | Humer | | |
| 7,537,286 B2 * | 5/2009 | Walker | ............... | B64D 11/0689 |
| | | | | 297/284.3 |
| 7,549,699 B2 | 6/2009 | Humer | | |
| 8,360,522 B2 * | 1/2013 | Akutsu | ............... | B60N 2/838 |
| | | | | 297/284.4 |
| 8,708,411 B2 | 4/2014 | Nakamura | | |
| 9,187,012 B2 | 11/2015 | Sachs | | |
| 9,272,643 B2 * | 3/2016 | Nagayasu | ............. | B60N 2/986 |
| 9,358,913 B2 | 6/2016 | Schurg | | |
| 9,889,773 B2 | 2/2018 | Line | | |
| 10,166,888 B2 * | 1/2019 | Sugiyama | ............... | B60N 2/64 |

(Continued)

FOREIGN PATENT DOCUMENTS

GB        2405791 A        3/2005

*Primary Examiner* — Philip F Gabler
(74) *Attorney, Agent, or Firm* — Vichit Chea; Price Heneveld LLP

(57) ABSTRACT

A vehicle seating assembly includes a seat and a seatback. The seatback includes a frame that has opposing first and second frame members and first and second displaceable panels that are pivotably coupled to the first and second frame members. The first and second displaceable panels are movable between stored positions and deployed positions in response to a force exerted on the seatback.

10 Claims, 7 Drawing Sheets

(56) References Cited

U.S. PATENT DOCUMENTS

| | | |
|---|---|---|
| 10,377,279 B2 | 8/2019 | Line |
| 10,414,293 B2 | 9/2019 | Sasaki |
| 10,737,599 B2 | 8/2020 | Yoshikawa |
| 10,829,018 B2 | 11/2020 | Burton |
| 11,396,253 B1 | 7/2022 | Line |
| 11,541,785 B2 | 1/2023 | Sugiyama |
| 2010/0141001 A1* | 6/2010 | Matano .................... B60N 2/66 297/284.8 |
| 2020/0070690 A1 | 3/2020 | Merchant |
| 2022/0289086 A1 | 9/2022 | Line |

\* cited by examiner

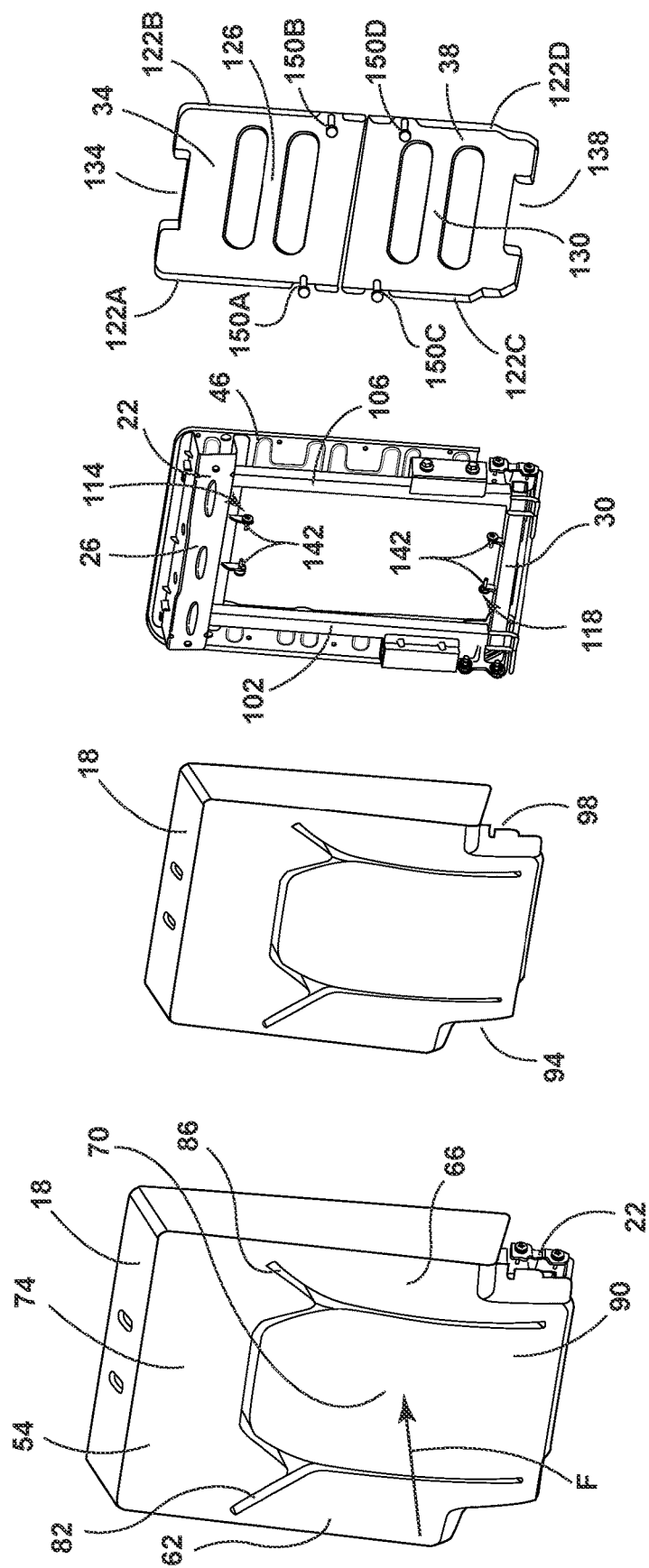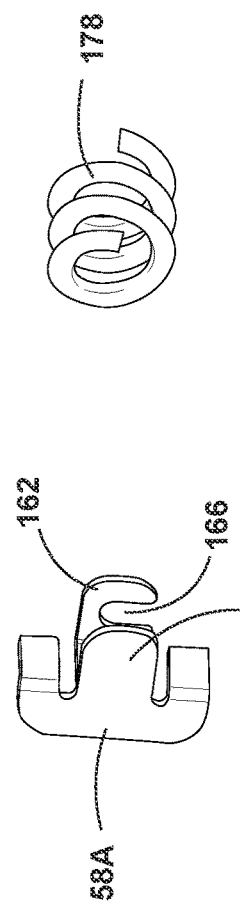

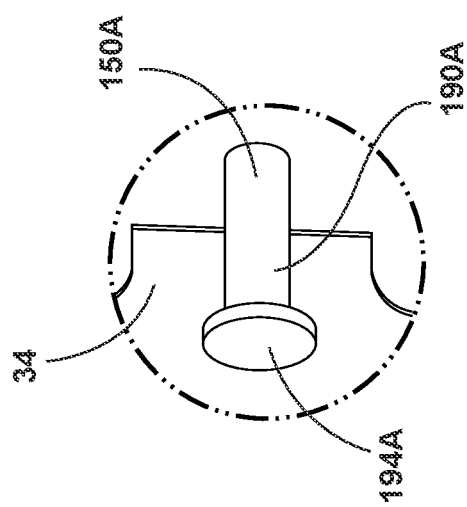
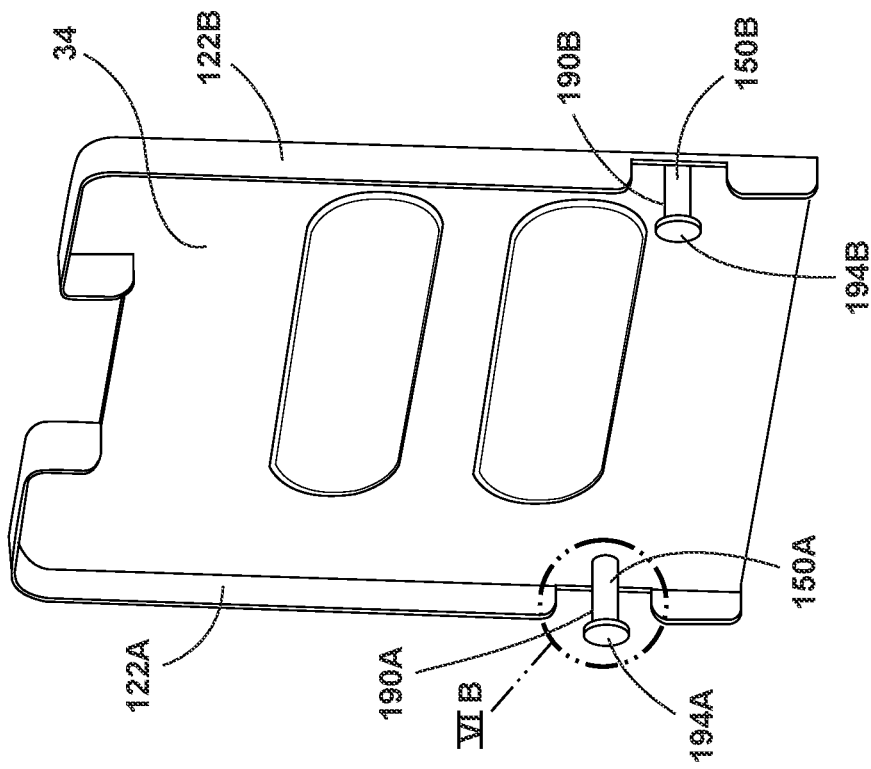
FIG. 6B
FIG. 6A

DISPLACEABLE PANEL FOR SEATING ASSEMBLY

CROSS-REFERENCE TO RELATED APPLICATION

This application is a divisional of U.S. patent application Ser. No. 17/446,722 filed Sep. 2, 2021, now U.S. Pat. No. 11,820,259, entitled "DISPLACEABLE PANEL FOR SEATING ASSEMBLY." The aforementioned related application is hereby incorporated by reference.

FIELD OF THE DISCLOSURE

The present disclosure generally relates to a seating assembly for a vehicle.

BACKGROUND OF THE DISCLOSURE

A seating assembly for a vehicle may include many occupant comfort features. It may be advantageous to provide additional seating space in a vehicle seating assembly.

SUMMARY OF THE DISCLOSURE

According to a first aspect of the present disclosure, a vehicle seating assembly includes a seat and a seatback that includes a frame that has opposing first and second frame members, and first and second displaceable panels that are pivotably coupled to the first and second frame members and are movable between stored positions and deployed positions in response to a force exerted on the seatback.

Embodiments of the first aspect of the present disclosure can include any one or a combination of the following features:
- a first displacement limiter that extends between the first displaceable panel and the frame;
- a second displacement limiter that extends between the second displaceable panel and the frame;
- the first and second displacement limiters may each extend from the frame;
- the first and second displacement limiters may be slidably coupled to pegs that extend from the first and second displaceable panels;
- the pegs include a cylindrical portion and a stopper portion;
- the first and second displacement limiters each include a bracket that has a slot positionable around the cylindrical portion;
- the first and second displacement limiters each include a biasing member;
- the frame includes opposing first and second frame members;
- the first and second displaceable panels are rotatably coupled to the opposing first and second frame members;
- the first and second frame members include upper and lower frame members;
- a back panel may be disposed around the frame; and
- the first and second displaceable panels and the back panel may form a substantially flat load floor when the seatback is in a folded position According to a second aspect of the present disclosure, a vehicle seating assembly includes a frame. A back wall may be formed by adjacent displaceable panels that are rotatably coupled to the frame and are movable between a stored position and a deployed position in response to an actuation force that is disposed on a seatback. A pair of displacement limiters are disposed between each of the adjacent displaceable panels and the frame. A pair of biasing members are coupled to the pair of displacement limiters and are configured to return the adjacent displaceable panels to the stored position from the deployed position.

Embodiments of the second aspect of the present disclosure can include any one or a combination of the following features:
- a pair of hinge assemblies are disposed between each of the adjacent displaceable panels and the frame;
- the vehicle seating assembly further includes a foam cushion;
- the frame is disposed between the foam cushion and the adjacent displaceable panels;
- the frame includes opposing frame members;
- each of the adjacent displaceable panels are rotatably coupled to the opposing frame members; and
- inner edges of each of the adjacent displaceable panels are disposed along a center portion of the seatback.

According to a third aspect of the present disclosure, a vehicle seating assembly includes a seat and a seatback that includes a frame. The frame has substantially horizontal frame members and substantially vertical frame members. The vehicle seating assembly further includes first and second support members that are operably coupled to the substantially horizontal frame members, and first and second displacement limiters that are coupled to the first and second support members. The first and second support members are movable between a stored position and a deployed position in response to a force that is exerted on the seatback.

Embodiments of a third aspect of the present disclosure can include any one or a combination of the following features:
- the first and second displacement limiters may extend between the first and second support members and the frame;
- the first and second support members include flanges that extend orthogonally from the first and second support members;
- a back support member is disposed proximate the frame; and
- the back support member and the first and second support members define a substantially flat load floor when the seatback is in a folded position;

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2A is a perspective view of the seatback, according to an aspect of the disclosure;

FIG. 2B is a perspective view of a cushion of the seatback, according to an aspect of the disclosure;

FIG. 2C is a perspective view of a frame with a back panel disposed proximate the outer edges of the frame, according to an aspect of the disclosure;

FIG. 2D is a perspective view of the displaceable panels, according to an aspect of the disclosure;

FIG. 2E is a perspective view of a displacement limiter, according to an aspect of the disclosure;

FIG. 2F is a perspective view of a biasing member, according to an aspect of the disclosure;

FIG. 6A is a front perspective view of a displaceable panel, according to an aspect of the disclosure;

FIG. 6B is a front perspective view of a peg shown in FIG. 6A, according to an aspect of the disclosure;

DETAILED DESCRIPTION

Figure 1:
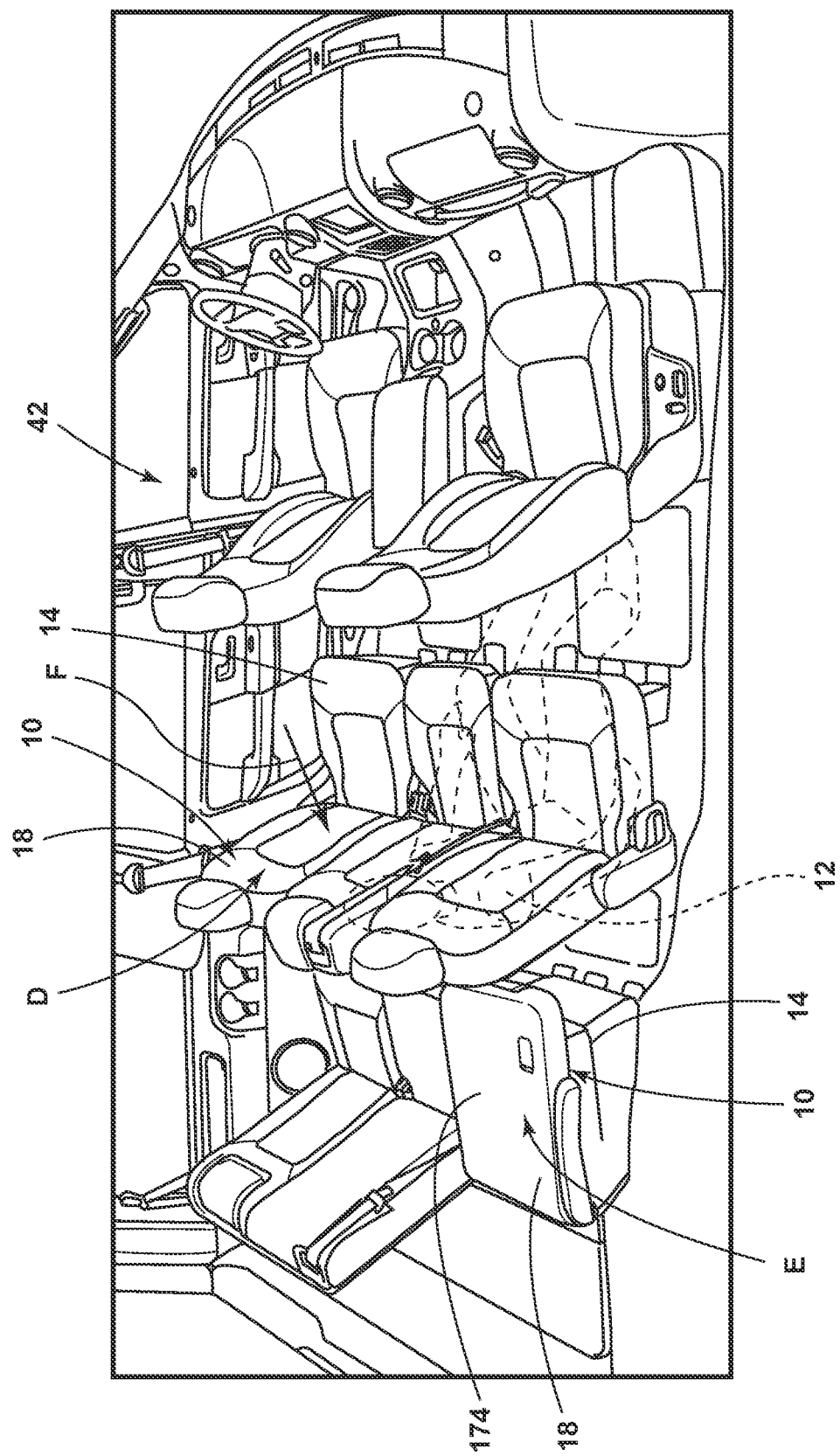
FIG. 1 is a perspective view of a vehicle interior, according to an aspect of the disclosure.

Referring to FIGS. 1-8D, a vehicle seating assembly 10 includes a seat 14 and a seatback 18. The seatback 18 includes a frame 22 having opposing first and second frame members (for example, frame member 26 and frame member 30) and first and second displaceable panels (for example, displaceable panel 34 and displaceable panel 38) pivotably coupled to the first and second frame members (for example, frame member 26 and frame member 30). The first and second displaceable panels (for example, displaceable panel 34 and displaceable panel 38) are movable between stored positions A and deployed positions B in response to a force F exerted on the seatback 18.

Referring to FIG. 1, a vehicle interior 42 may include seating assemblies 10 with displaceable panels 34 and 38. If a seatback 18 is in the upright position D, the displaceable panels 34 and 38 may move from the stored position A to the deployed position B to provide additional seating space for the occupant 12. If a seatback 18 is in the folded position E, the displaceable panels 34 and 38 and the back panel 46 disposed around the frame 22 may support cargo or other items disposed on the seatback 18 in the folded position E.

Referring to FIG. 2A, the seatback 18 may include the components shown in FIGS. 2B-2F. The components of the seatback 18 may include the cushion 54 (FIG. 2B), the frame 22 with a back panel 46 (FIG. 2C), the displaceable panels 34 and 38 (FIG. 2D), a displacement limiter (for example, bracket 58A) (FIG. 2E), and a biasing member (for example, compression spring 178) (FIG. 2F). Referring to FIG. 2A, the cushion 54 and the frame 22 are shown. The cushion 54 may be a foam cushion. In various examples, the cushion 54 may be made of other materials in addition to or instead of foam. Referring to FIG. 2B, the cushion 54 may include a right bolster portion 62, a left bolster portion 66, a center portion 70, and an upper portion 74. A U-shaped depression 78 may be formed around the center portion 70. The U-shaped depression 78 may separate the center portion 70 from the right bolster portion 62, the left bolster portion 66, and the upper portion 74. The U-shaped depression 78 may allow the center portion 70 to move inward when an actuation force F is applied on the center portion 70. Movement of the center portion 70 inward may cause the displaceable panels 34 and 38 to move from stored positions A to deployed positions B. The U-shaped depression 78 may be molded into the foam. The U-shaped depression 78 may have set widths, lengths, depths, and shapes (curvatures, straight segments, etc.) that may allow for the center portion 70 of the cushion 54 to be displaced inward. A right offshoot segment 82 and a left offshoot segment 86 may extend from the U-shaped depression 78. The right and left offshoot segments 82 and 86 may allow for further movement of the center portion 70 relative to the right and left bolster portions 62 and 66. The lower portion 90 of the cushion 54 may include right and left cutaway portions 94 and 98 that may provide space for attaching the frame 22 to the seat 14. The right and left cutaway portions 94 and 98 may provide space for mounting the seatback 18 to the seat 14.

The sides of the seatback 18 may be referred to as a right side and a left side with reference to a seated occupant 12. The right side may be on the right side of a seated occupant 12. The left side may be on a left side of a seated occupant 12.

With reference to FIG. 2C, a back panel 46 may be disposed around the frame 22. The frame 22 may include substantially horizontal frame members (for example, frame member 26 and frame member 30) and substantially vertical frame members (for example, frame member 102 and frame member 106). In some examples, the frame 22 may include a stamped metal such as steel or aluminum. In some examples, the frame 22 may include a composite. In some examples, the back panel 46 may include a stamped metal such as steel or aluminum. In some examples, the back panel 46 may include a composite. The back panel 46 may rigid or semi-rigid. The back panel 46 may form the back contour of the seatback 18. The back panel 46 may provide a support surface for cargo when the seatback 18 is in a folded position E.

Referring now to FIGS. 2C-2D, the displaceable panels 34 and 38 may be disposed within the frame 22. The displaceable panels 34 and 38 may be rotatably mounted to the substantially horizontal frame members 26 and 30. The displaceable panel 34 may be referred to as the upper displaceable panel. The displaceable panel 38 may be referred to as the lower displaceable panel. The frame member 26 may be referred to as an upper frame member. The frame member 30 may be referred to as a lower frame member. In the examples shown, a hinge assembly 114 may rotatably couple the upper displaceable panel 34 to the substantially horizontal upper frame member 26. A hinge assembly 118 may rotatably couple the lower displaceable panel 38 to the substantially horizontal lower frame member 30. In addition to the hinge assemblies 114 and 118, it is contemplated that other mechanical assemblies may secure the displaceable panels 34 and 38 to the substantially horizontal frame members 26 and 30. The displaceable panels 34 and 38 may be referred to as doors. The displaceable panels 34 and 38 may include a stamped metal such as steel or aluminum. The displaceable panel 34 may include flanges 122A and 122B. The flanges 122A and 122B may extend toward the frame 22. The displaceable panel 38 may include flanges 122C and 122D. The flanges 122C and 122D may extend toward the frame 22. The flanges 122A and 122B may be orthogonal to the base portion 126 of displaceable panel 34. The flanges 122C and 122D may be orthogonal to the base portion 130 of displaceable panel 38. The flanges 122A and 122B may be adjacent to the substantially horizontal frame member 26 and the substantially vertical frame members 102 and 106. The flanges 122C and 122D may be adjacent to the substantially horizontal frame member 30 and the substantially vertical frame members 102 and 106. The arrangement of the flanges 122A, 122B, 122C, and 122D in relation to the substantially horizontal frame members 26 and 30 and the substantially vertical frame members 102 and 106 may minimize the movement of the displaceable panels 34 and 38 in the frame 22, thereby reducing NVH (Noise Vibration Harshness) and BSR (Buzz Squeak Rattle) of the seatback 18. The displaceable panels 34 may include cutaway portion 134 with flanges 122A and 122B that may be mechanically coupled to pins 142 extending from the seat frame 22. The displaceable panel 38 may include cutaway portion 138 with flanges 122C and 122D that may be mechanically coupled to pins 142 extending from the seat frame 22. The cutaway portions 134 and 138 may include holes 146 for receiving the pins 142. The hinge assemblies 114 and 118 may include the pins 142 disposed through the holes 146 (FIGS. 8C and 8D). The displaceable panel 34 may include pegs 150A and 150B that may engage with the brackets 58A and 58B. The displaceable panel 38 may include pegs 150C and 150D that may engage with the brackets 58C and 58D.

Referring to FIG. 2E, a displacement limiter may include a bracket 58A. The bracket 58A may be a stamped metal or a composite. The bracket 58A may be secured to the frame 22. The bracket 58A may be welded, glued, or otherwise secured to the frame 22. The bracket 58A may include a flange 162 with a slot 166 for receiving the peg 150A that extends from the displaceable panel 34. The flange 162 with the slot 166 may limit the outward movement of the displaceable panel 34 as it moves from the stored position A to the deployed position B. The bracket 58A may also include a stopper 170. The stopper 170 may limit the inward movement of the displaceable panel 34 as it moves from the deployed position B to the stored position A. If the seatback 18 is in the folded position E, then the stopper 170 may limit downward movement of the displaceable panel 34. As such, the displaceable panels 34 and 38 and the back panel 46 may form a substantially flat load floor 174 (FIG. 1).

With reference to FIG. 2F, a biasing member may be disposed in the displacement limiter to bias the support member to return from the deployed position B to the stored position A. The biasing member may be a compression spring 178. The compression spring 178 may be disposed in the bracket 58A.

It is to be understood that the displaceable panels 34 and 38 may be examples of support members that may be moved from the stored position A to the deployed position B. In addition to displaceable panels 34 and 38, support members may include doors and other rigid or semi-rigid structures. Support members may include mesh and/or other woven members disposed on a support structure. The back panel 46 may be referred to as a back support member.

Figure 3:
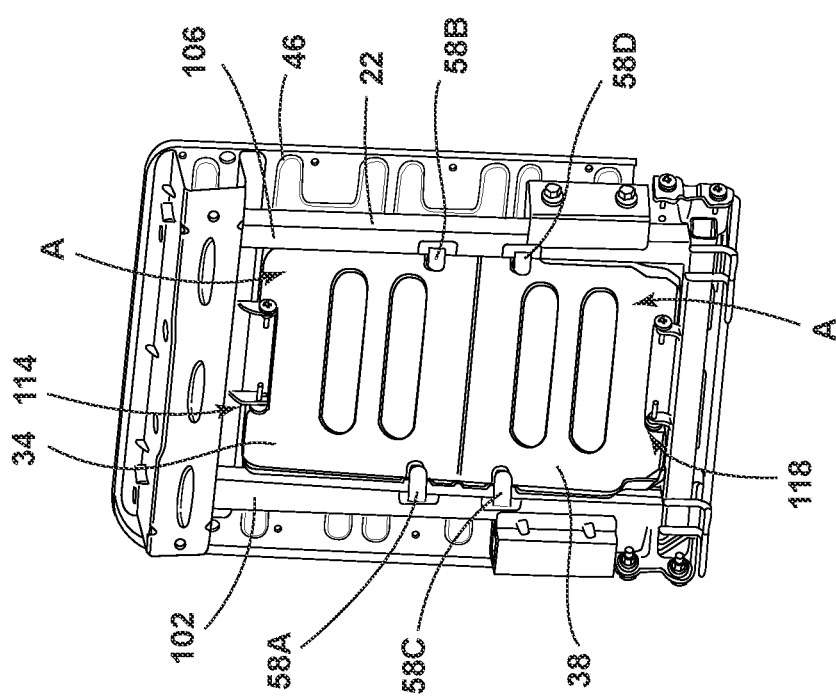
FIG. 3 is a front perspective view of the frame with a back panel disposed proximate the outer edges of the frame and displaceable panels, according to an aspect of the disclosure.

Referring now to FIG. 3, the displaceable panels 34 and 38 are shown in the stored positions A. The upper hinge assembly 114 may be disposed between the displaceable panel 34 and the substantially horizontal frame member 26. The lower hinge assembly 118 may be disposed between the displaceable panel 38 and the substantially horizontal frame member 30. The brackets 58A and 58B may be disposed between the displaceable panel 34 and the substantially vertical frame members 102 and 106. The brackets 58C and 58D may be disposed between the displaceable panel 38 and the substantially vertical frame members 102 and 106.

Figure 4:
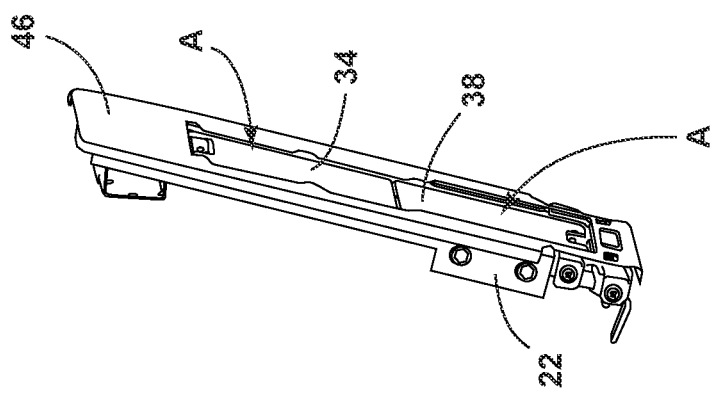
FIG. 4 is a left side perspective view of the frame with a back panel and displaceable panels of FIG. 3 with the displaceable panels in the stored position, according to an aspect of the disclosure.

Referring to FIG. 4, the displaceable panels 34 and 38 are in the stored positions A. In the example shown, the back panel 46 may be a continuous member disposed around the displaceable panels 34 and 38.

Figure 5:
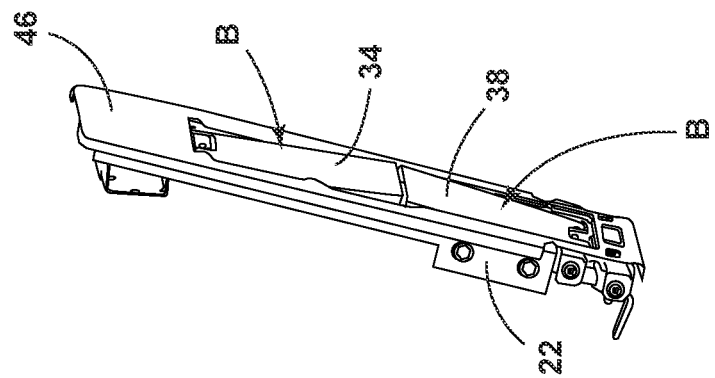
FIG. 5 is a left side perspective view of the frame with a back panel and displaceable panels of FIG. 3 with the displaceable panels in the deployed position, according to an aspect of the disclosure.

Referring now to FIG. 5, the displaceable panels 34 and 38 are shown in the deployed positions B. The displaceable panels 34 and 38 may be in the deployed positions B because an actuation force F has been exerted on the seatback 18. The brackets 58A, 58B, 58C, and 58D may limit the displacement distance X of the displaceable panels 34 and 38.

Referring now to FIGS. 6A-6B, the pegs 150A, 150B, 150C, and 150D may include a cylindrical portion 190A, 190B, 190C, and 190D and a stopper portion 194A, 194B, 194C, and 194D. The flanges 122A, 122B, 122C, and 122D may be disposed on either side of the pegs 150A, 150B, 150C, and 150D. The displaceable panels 34 and 38 may include depressions 198 that may strengthen the displaceable panels 34 and 38.

Referring now to FIGS. 7A-7E, the frame 22, the back panel 46, the displaceable panels 34 and 38, and the brackets 58A, 58B, 58C, and 58D are shown. Tethers 202 may secure child seats or other objects to the frame 22. The hinge assemblies 114 and 118 may define axes of rotation I and II about which the displaceable panels 34 and 38 may rotate. The displaceable panels 34 and 38 may rotate about the axes of rotation I and II from the stored position A to the deployed position B in the directions shown by arrows 206 and 210.

Figure 7D:
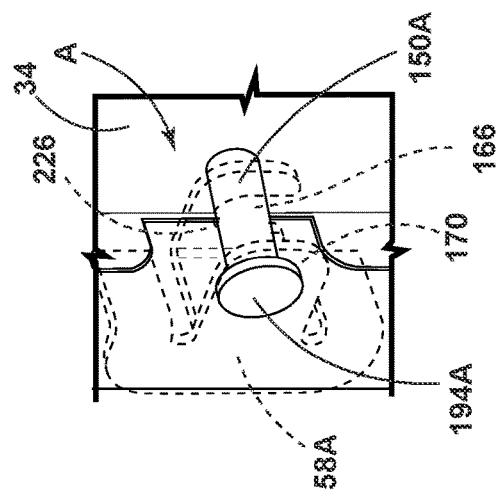
FIG. 7D is a left side perspective view of a peg disposed in a slot of the displacement limiter with the displaceable panel in the stored position, according to an aspect of the disclosure.
Figure 7E:
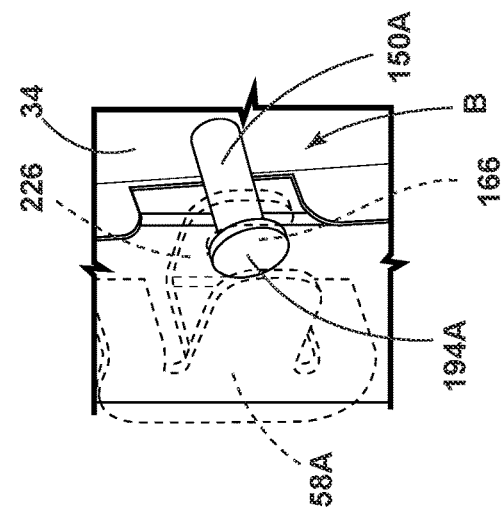
FIG. 7E is a left side perspective view of a peg disposed in a slot of the displacement limiter with the displaceable panel in the deployed position, according to an aspect of the disclosure.
Figure 7B:
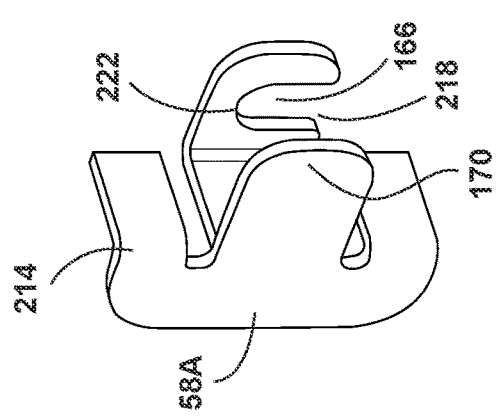
FIG. 7B is a left side perspective view of a displacement limiter, according to an aspect of the disclosure.

With reference to FIG. 7B, the bracket 58A may be disposed on a corner of the substantially frame member 102. The bracket 58A may include an elbow bend 214 designed for placement of the bracket 58A on the frame member 102 Referring to FIG. 7C, the peg 150A extending from the displaceable panel 34 may be disposed in the slot 166 of the bracket 58A. The openings 218 of the slots 166 may be positioned to facilitate convenient assembly of the displaceable panels 34 and 38 to the frame 22. During assembly of the seatback 18, the pegs 150A and 150B of the upper displaceable panel 34 may slide into the slots 166 of the brackets 58A and 58B. The openings 218 of the slots 166 in the brackets 58A and 58B may be positioned in a downward direction. The openings 218 of the slots 166 in the brackets 58C and 58D may be positioned in an upward position. During the seatback assembly process, once the pegs 150A and 150B of the upper displaceable panel 34 abut the ends 222 of the slots 166 of the brackets 58A and 58B, the displaceable panel 34 may be secured to the frame member 26 at the hinge assembly 114. The upper displacement panel 34 may be coupled to the frame 22 with the pins 142. The pins 142 may define the axis of rotation I that the upper displacement panel 34 rotates around. As such, the openings 218 of the slots 166 are positioned to facilitate efficient assembly of the seatback 18.

Figure 7C:
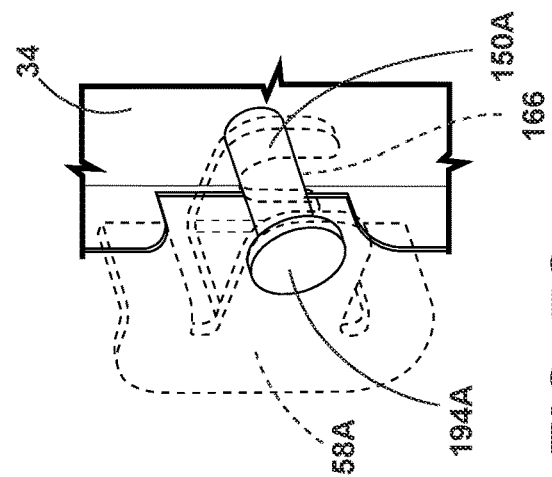
FIG. 7C is a left side perspective view of a peg disposed in a slot of the displacement limiter, according to an aspect of the disclosure.
Figure 7A:
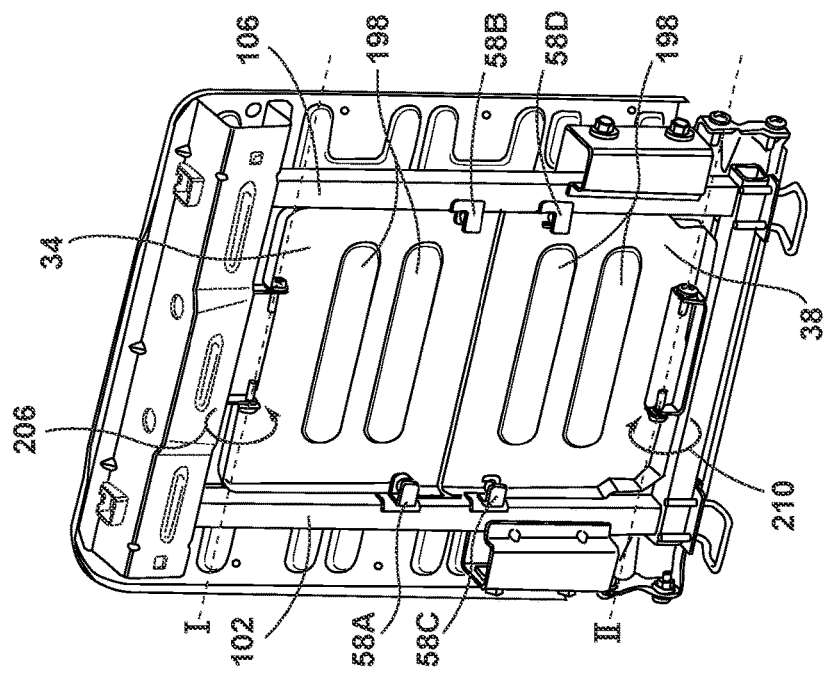
FIG. 7A is a front perspective view of the frame, the back panel, the displaceable panels, and the displacement limiters, according to an aspect of the disclosure.

With reference to FIGS. 7C and 7D, the peg 150A is shown in the bracket 58A when the displaceable panel 34 is in the stored position A. The stopper portion 194A of the peg 150A is shown abutting the stopper 170 of the bracket 58A.

With reference to FIG. 7E, the peg 150A is shown in the bracket 58A when the displaceable panel 34 is in the deployed position B. The stopper portion 194A of the peg 150A is shown abutting the flange 226. The displacement distance X of each of the displaceable panels 34 and 38 from the stored positions A to the deployed positions B may be measured by the distance that the compression spring 178 compresses as the displaceable panels 34 and 38 move from the stored positions A to the deployed positions B. As such, displacement distance X may define how much the displaceable panels 34 and 38 may be displaced rearward. In one example, the displacement distance X may be in the approximate range of approximately 7.0 millimeters to approximately 30.0 millimeters and ideally in the approximate range of approximately 13.0 millimeters to approximately 15.0 millimeters.

It is to be understood that a displacement limiter may include a variety of devices similar to the bracket 58. It is also to be understood that, in some examples, a displacement limiter may receive a variety of devices similar to the peg 150. In some examples, a displacement limiter may not receive a device similar to a peg 150. In some examples, a displacement limiter may be a damper. In some examples, a displacement limiter may be a piston. In some examples, a displacement limiter may include springs other than compression springs 178 (for example, torsion springs, leaf springs, and others). A displacement limiter may utilize a variety of biasing members. A displacement limiter may utilize no biasing members.

Figure 8B:
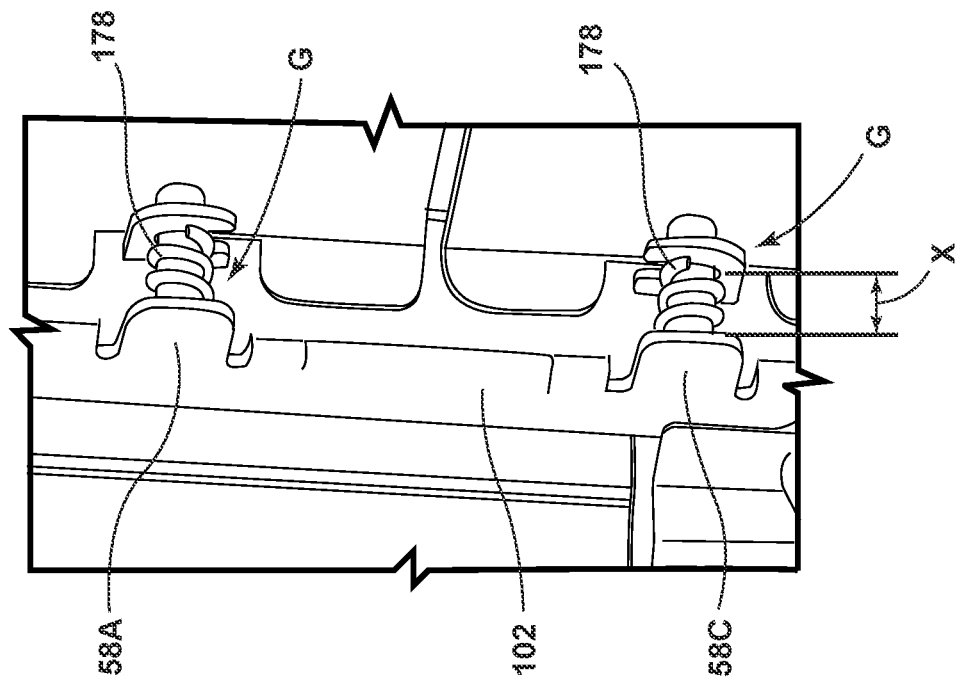
FIG. 8B is an exploded view of the displacement limiters, the displaceable panels, and the biasing members of FIG. 8A, according to an aspect of the disclosure.
Figure 8A:
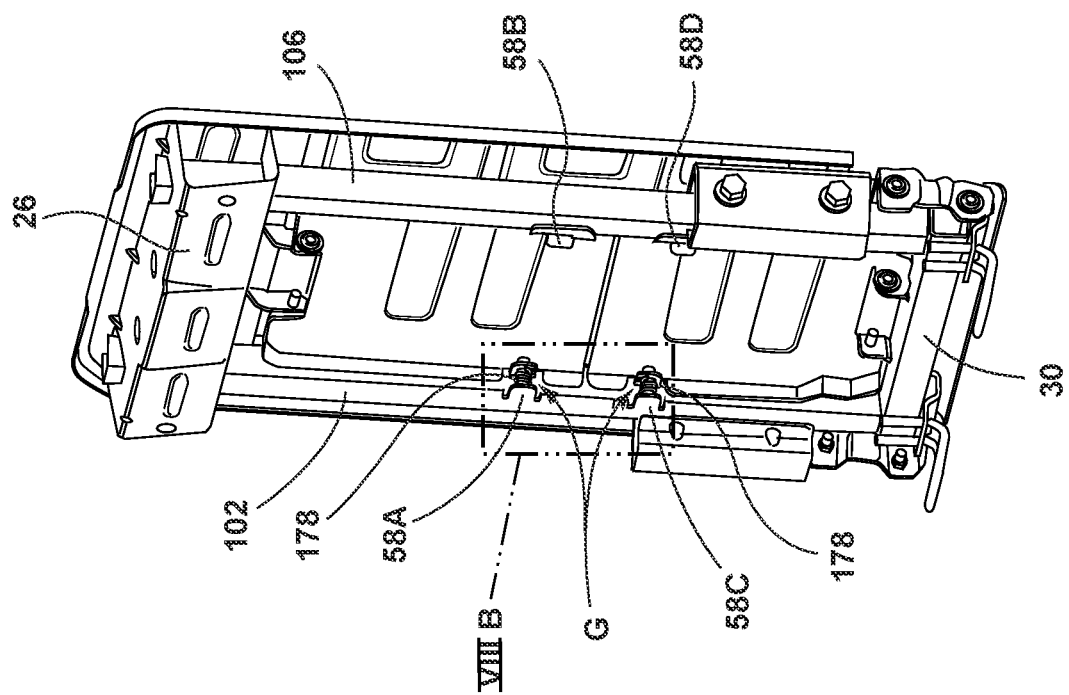
FIG. 8A is a left side perspective view of the frame, the back panel, and the displaceable panels with biasing members disposed in the displacement limiters, according to an aspect of the disclosure.
Figure 8D:
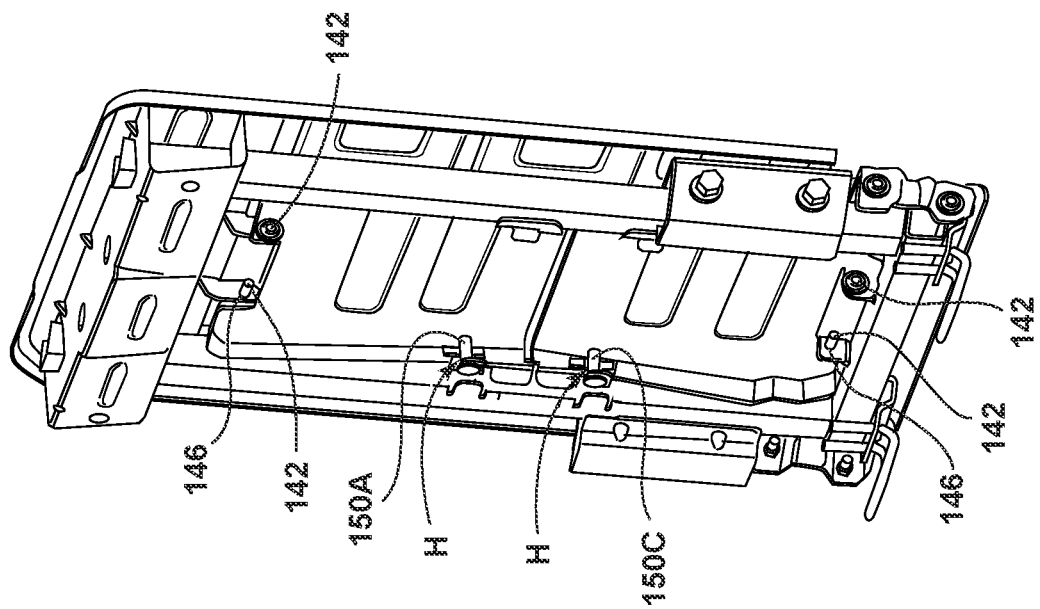
FIG. 8D is a left side perspective view of the frame, the back panel, the displaceable panels, the displacement limiters, and the biasing members of FIG. 8A with the displaceable panels in the deployed position, according to an aspect of the disclosure.
Figure 8C:
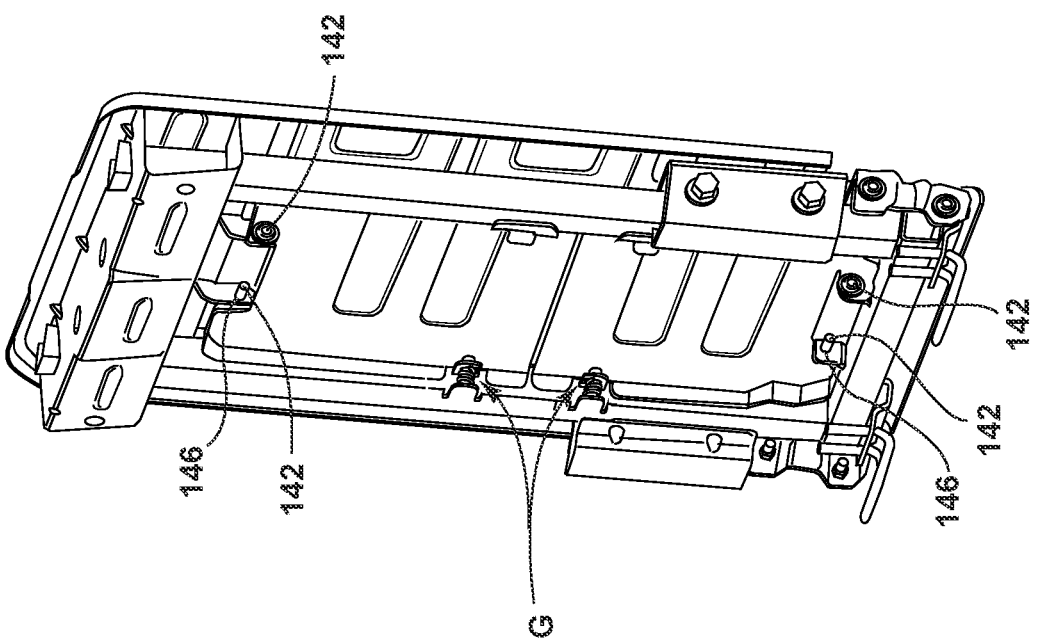
FIG. 8C is a left side perspective view of the frame, the back panel, the displaceable panels, the displacement limiters, and the biasing members of FIG. 8A with the displaceable panels in the stored position, according to an aspect of the disclosure.

Referring now to FIGS. 8A-8C, the displaceable panels 34 and 38 are shown disposed against the frame 22. The biasing members may be disposed in the displacement limiters. Specifically, the compression springs 178 are shown in an extended position G, thereby substantially maintaining the displaceable panels 34 and 38 in the stored positions A. Referring to FIG. 8D, the displaceable panels 34 and 38 are in the deployed positions B, and the compression springs 178 are in the compressed positions H.

It is contemplated that the hinge assemblies may be disposed in a substantially vertical orientation on the substantially vertical frame members disposed on either side of the frame. It is contemplated that the displaceable panels may rotatable about axes defined by the hinge assemblies in the substantially vertical positions. It is contemplated that the hinge assemblies and the displaceable panels may be disposed on the frame in various orientations in addition to the substantially horizontal orientation and the substantially vertical orientation.

A variety of advantages may be obtained by use of the present disclosure. The occupant 12 may lean backward into the seatback 18 by exerting the actuation force F on the seatback 18 and causing the displaceable panels 34 and 38 to move from the stored position A to the deployed position B. The displaceable panels 34 and 38 in the deployed position B may provide more space for the occupant 12 than the displaceable panels 34 and 38 in the stored position A. Additionally, a seatback 18 with the displaceable panels 34 and 38 in the deployed position B may provide a more comfortable seating space for the occupant 12 than a seatback 18 with the displaceable panels 34 and 38 in the stored position A. When the seatback 18 is in the folded position E, the back panel 46 of the frame 22 and the displaceable panels 34 and 38 in the stored position A may provide a rigid or semi-rigid load floor 174 for storing cargo. The biasing members in the displacement limiters that bias the displaceable panels 34 and 38 toward the stored position A may help maintain a substantially flat load floor 174. Thus, the occupant 12 penetration into the seatback 18 due to displacement of the displaceable panels 34 and 38 may occur while allowing for a substantially flat load floor 174 if the seatback 18 is in the folded position E. A substantially compact cushion 54 that may allow the seatback 18 to be placed in the folded position E to form a substantially flat load floor 174 may be utilized because the displaceable panels 34 and 38 in deployed positions B and the positions between the stored positions A and the deployed positions B may provide an occupant 12 with additional seating space. The indentations (for example, U-shaped depression 78) in the cushion 54 may facilitate movement of the occupant 12 into the cushion 54 as the displaceable panels 34 and 38 move from the stored position A to the deployed position B. The cushion 54, frame 22, back panel 46, and the displaceable panels 34 and 38 may be compact. Therefore, the cushion 54, frame 22, back panel 46, and the displaceable panels 34 and 38 may be conveniently moved from the upright position D to the folded position E to create a substantially flat load floor 174.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
    a frame having first and second frame members;
    a back wall formed by adjacent displaceable panels rotatably coupled to the frame and movable between a stored position and a deployed position in response to an actuation force disposed on a seatback, wherein the adjacent displaceable panels include an upper displaceable panel pivotably coupled to the first and second frame members and having a lower end and an upper end, and a lower displaceable panel pivotably coupled to the first and second frame members of the frame and having a lower end and an upper end, wherein the lower end of the upper displaceable panel abuts the upper end of the lower displaceable panel, and wherein the upper displaceable panel is configured to pivot relative to the frame about the upper end of the upper displaceable panel and the lower displaceable panel is configured to pivot relative to the frame about the lower end of the lower displaceable panel;
    a pair of displacement limiters disposed between each of the adjacent displaceable panels and the frame; and
    a pair of biasing members coupled to the pair of displacement limiters and configured to return the adjacent displaceable panels to the stored position from the deployed position.

2. The vehicle seating assembly of claim 1, further comprising:

a pair of hinge assemblies disposed between each of the adjacent displaceable panels and the frame.

3. The vehicle seating assembly of claim 2, further comprising:
a foam cushion, wherein the frame is disposed between the foam cushion and the adjacent displaceable panels.

4. The vehicle seating assembly of claim 3, wherein the frame includes opposing frame members and wherein each of the adjacent displaceable panels are rotatably coupled to the opposing frame members.

5. The vehicle seating assembly of claim 4, wherein inner edges of each of the adjacent displaceable panels are disposed along a center portion of the seatback.

6. The vehicle seating assembly of claim 1, wherein the upper and lower displaceable panels are pivotally coupled to the first and second frame members of the frame.

7. The vehicle seating assembly of claim 6, wherein the pair of displacement limiters comprises:

a first displacement limiter extending between the upper displaceable panel and the frame; and
a second displacement limiter extending between the lower displaceable panel and the frame.

8. The vehicle seating assembly of the claim 1, wherein the first displacement limiter extends from the frame to a lower portion of the first displaceable panel and the second displacement limiter extends from the frame to an upper portion of the second displaceable panel.

9. The vehicle seating assembly of the claim 8, wherein the first and second displacement limiters are slideably coupled to pegs extending from the first and second displaceable panels, wherein the pegs include a cylindrical portion and a stopper portion.

10. The vehicle seating assembly of claim 9, wherein the first and second displacement limiters each include a bracket having a slot positionable around the cylindrical portion.

* * * * *